(12) United States Patent
Newman

(10) Patent No.: US 11,130,196 B2
(45) Date of Patent: Sep. 28, 2021

(54) SINGLE-POSITION SEQUENTIAL LASER WELDING SYSTEM

(71) Applicant: NIO USA, Inc., San Jose, CA (US)

(72) Inventor: Austin L. Newman, San Jose, CA (US)

(73) Assignee: NIO USA, Inc., San Jose, CA (US)

(*) Notice: Subject to any disclaimer, the term of this patent is extended or adjusted under 35 U.S.C. 154(b) by 982 days.

(21) Appl. No.: 15/474,860

(22) Filed: Mar. 30, 2017

(65) Prior Publication Data
US 2018/0281110 A1 Oct. 4, 2018

(51) Int. Cl.
| | |
|---|---|
| *B23K 26/21* | (2014.01) |
| *B23K 26/06* | (2014.01) |
| *B23K 26/382* | (2014.01) |
| *B23K 26/50* | (2014.01) |
| *B23K 26/70* | (2014.01) |
| *H01M 10/04* | (2006.01) |
| *B23K 26/244* | (2014.01) |
| *B23K 26/22* | (2006.01) |
| *B23K 26/073* | (2006.01) |
| *H01M 50/502* | (2021.01) |
| *H01M 50/543* | (2021.01) |
| *B23K 101/38* | (2006.01) |
| *H01R 43/02* | (2006.01) |

(52) U.S. Cl.
CPC ............ *B23K 26/21* (2015.10); *B23K 26/073* (2013.01); *B23K 26/22* (2013.01); *B23K 26/244* (2015.10); *B23K 26/382* (2015.10); *H01M 50/502* (2021.01); *H01M 50/543* (2021.01); *B23K 2101/38* (2018.08); *H01M 2220/20* (2013.01); *H01R 43/0221* (2013.01)

(58) Field of Classification Search
CPC ........ B23K 26/21; B23K 26/38; B23K 26/70; B23K 26/50; B23K 26/06; H01M 10/04
USPC ......................................... 219/121.6–121.86
See application file for complete search history.

(56) References Cited

U.S. PATENT DOCUMENTS

| | | | | |
|---|---|---|---|---|
| 3,169,309 A | * | 2/1965 | Groman ................. | B23K 9/007 228/164 |
| 3,984,652 A | * | 10/1976 | Graville .................. | B23K 9/23 219/73 |
| 4,053,692 A | * | 10/1977 | Dey ........................ | H01M 6/14 429/171 |

(Continued)

FOREIGN PATENT DOCUMENTS

JP 2013043292 A * 3/2013

*Primary Examiner* — Ibrahime A Abraham
*Assistant Examiner* — Gyounghyun Bae
(74) *Attorney, Agent, or Firm* — Sheridan Ross P.C.

(57) ABSTRACT

Methods and systems for sequentially laser welding terminal tabs of a battery cell to corresponding terminal tabs of a busbar are described using a single laser position and path. The terminal tabs of a battery cell are aligned in contact with terminal tabs of a busbar. A laser welder, from a first position, generates a laser weld beam at a first diameter welding the first terminal tab of the battery cell to the first terminal tab of the busbar. Next, the laser weld beam is narrowed, reducing the first diameter to a smaller second diameter. Without moving the laser welder from the first position, the narrowed laser weld beam burns a hole through the welded first set of terminal tabs, traverses a gap toward a second set of terminal tabs behind the first set and welds the second set together.

20 Claims, 7 Drawing Sheets

(56) References Cited

U.S. PATENT DOCUMENTS

| | | | | |
|---|---|---|---|---|
| 4,707,424 A * | 11/1987 | Bowsky | H01M 50/169 | 429/181 |
| 5,376,467 A * | 12/1994 | Abe | H01M 50/3425 | 429/7 |
| 5,567,539 A * | 10/1996 | Takahashi | H01M 4/62 | 429/57 |
| 5,731,098 A * | 3/1998 | Suzuki | H01M 50/154 | 429/53 |
| 5,879,416 A * | 3/1999 | Nakamura | B23K 26/28 | 29/623.2 |
| 5,993,990 A * | 11/1999 | Kanto | H01M 2/0426 | 429/62 |
| 6,432,575 B1 * | 8/2002 | Yamagami | H01M 50/581 | 429/100 |
| 6,458,485 B2 * | 10/2002 | Yanai | H01M 10/4235 | 429/211 |
| 7,175,935 B2 * | 2/2007 | Welsh | H01M 10/05 | 429/62 |
| 7,786,404 B2 * | 8/2010 | Menin | B23K 26/0884 | 219/121.63 |
| 8,865,343 B2 * | 10/2014 | Park | H01M 50/572 | 429/169 |
| 9,634,298 B2 * | 4/2017 | Harima | H01M 2/0486 | |
| 2006/0096958 A1 | 5/2006 | Zhao et al. | | |
| 2006/0157457 A1 * | 7/2006 | Sakurai | B23K 26/0604 | 219/121.76 |
| 2006/0211158 A1 * | 9/2006 | Arai | B23K 26/03 | 438/8 |
| 2010/0248029 A1 * | 9/2010 | Butt | H01M 10/647 | 429/211 |
| 2011/0278266 A1 * | 11/2011 | Kobayashi | B23K 26/244 | 219/121.64 |
| 2012/0248076 A1 * | 10/2012 | Hosokawa | B23L 26/20 | 219/121.64 |
| 2013/0148925 A1 * | 6/2013 | Muendel | G02B 6/32 | 385/27 |
| 2013/0189560 A1 * | 7/2013 | Widhalm | H01M 2/206 | 429/121 |
| 2013/0260212 A1 * | 10/2013 | Kohno | H01M 2/30 | 429/158 |
| 2014/0120364 A1 * | 5/2014 | Peca | B23K 31/02 | 428/614 |
| 2015/0183058 A1 * | 7/2015 | Sugiyama | B23K 26/32 | 219/121.64 |
| 2015/0200386 A1 * | 7/2015 | Harayama | H01M 2/08 | 429/185 |
| 2015/0209909 A1 * | 7/2015 | Shimada | B23K 26/32 | 403/271 |
| 2015/0230341 A1 * | 8/2015 | Milne | H05K 3/0073 | 264/400 |
| 2017/0345612 A1 * | 11/2017 | Touya | H01J 37/045 | |

* cited by examiner

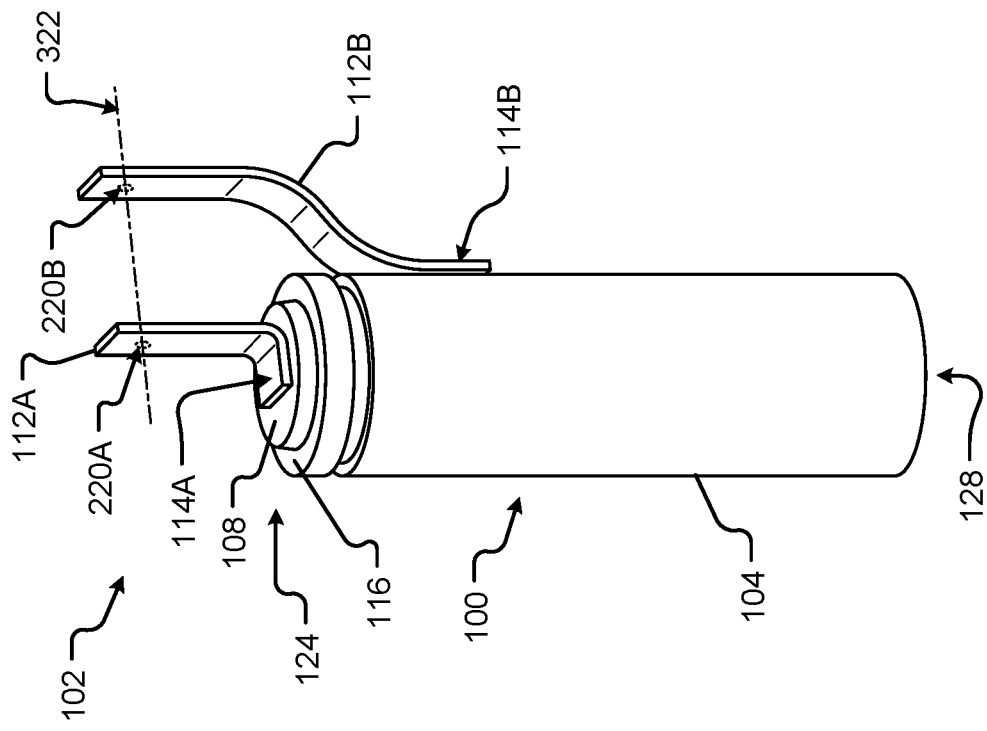
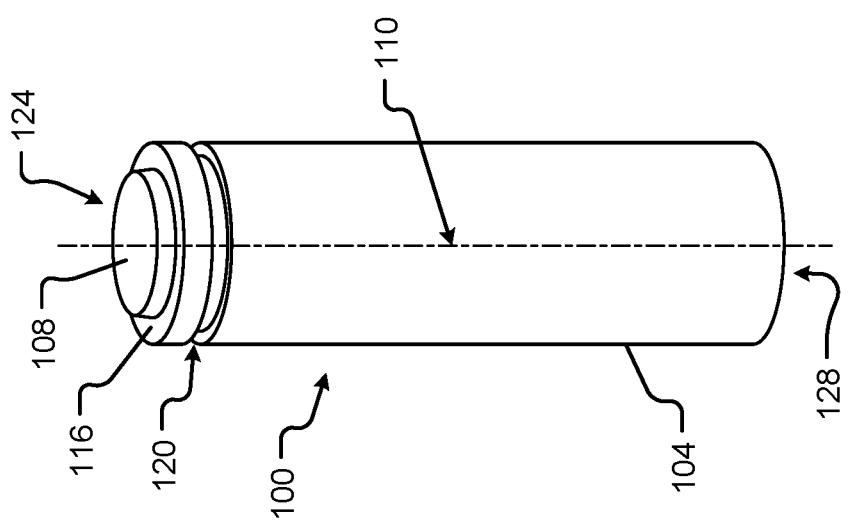

SINGLE-POSITION SEQUENTIAL LASER WELDING SYSTEM

FIELD

The present disclosure is generally directed to laser welding metal together, in particular, toward sequentially laser welding battery cell terminal tabs to corresponding busbar terminal tabs.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of battery cells. These battery cells are typically connected to an electrical control system to provide a desired available voltage, ampere-hour, and/or other electrical characteristics. In some cases, the battery cells may be connected to a busbar associated with the electrical control system. This busbar may be configured to distribute energy stored in the connected battery cells to one or more electric motors of the vehicle. The connection may be made by a physical interconnection or welding.

BRIEF DESCRIPTION OF THE DRAWINGS

FIG. 1A is a perspective view of a battery cell in accordance with embodiments of the present disclosure;

FIG. 1B is a perspective view of a weldable battery cell in accordance with embodiments of the present disclosure;

DETAILED DESCRIPTION

Figure 2A:
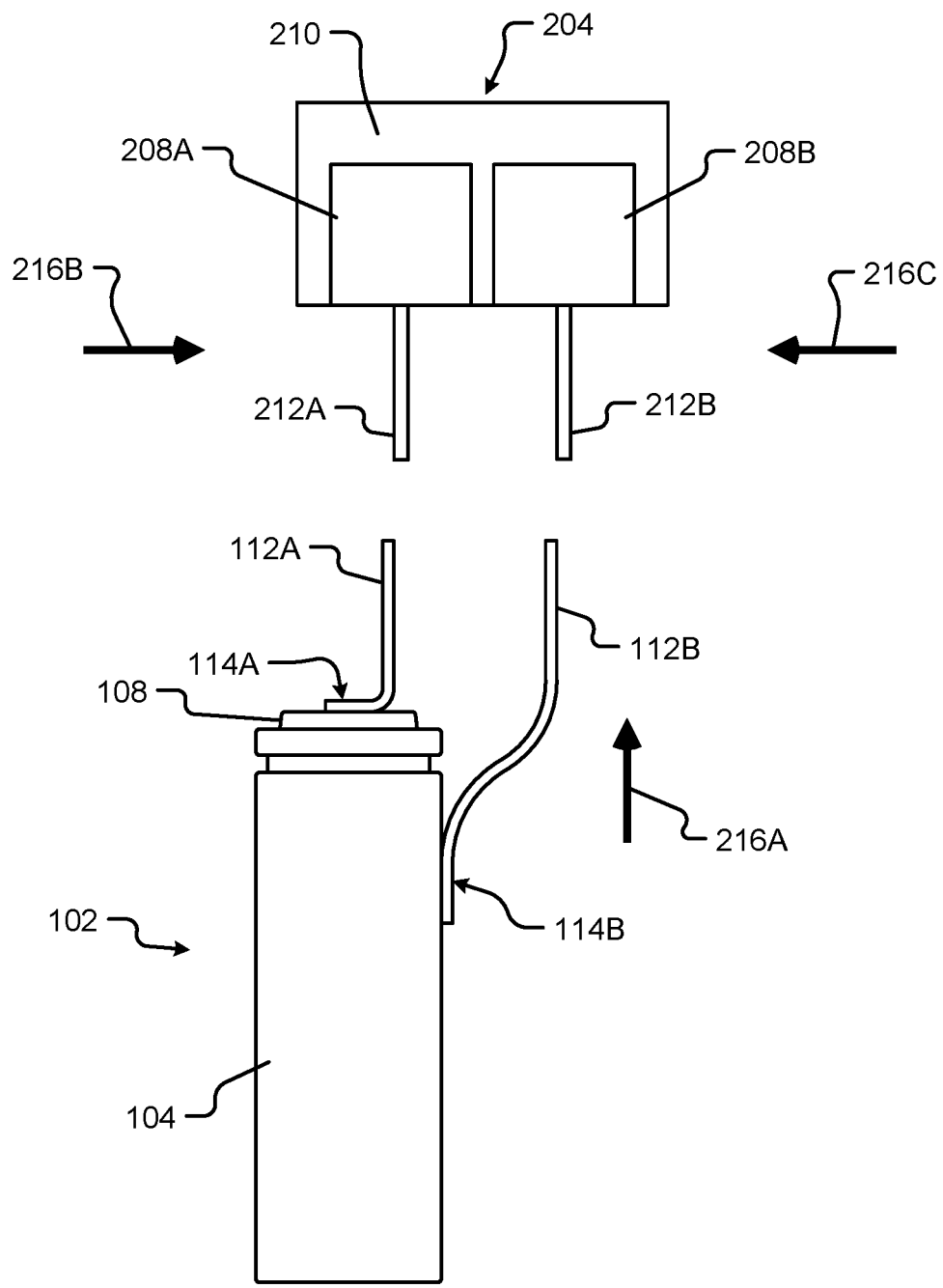
FIG. 2A shows a weldable battery cell separated from a busbar of an electrical system in accordance with embodiments of the present disclosure.

Embodiments of the present disclosure will be described in connection with an electric power distribution system, and in some embodiments a busbar of an electric vehicle.

Electrical connections between a battery cell and a busbar of a battery system are typically spot or laser welded. For every weld point in the system, the welder needs to be re-aimed and repositioned before the welding operation is completed. Where a battery cell includes both a positive and a negative electrical connection tab, or terminal tab, each of the tabs needs to be welded to different points on the busbar. Among other things, this constant re-aiming and repositioning of the welder for each weld point can increase the number of welding operations and significantly slow the manufacturing process.

It is an aspect of the present disclosure to provide methods, devices, and systems capable of welding multiple sets of terminal tabs together from a single laser position and aligned output path. In some embodiments, a single laser may be used to weld two electrical terminal tab sets together sequentially and without requiring a change in position to the laser or laser output beam between welding each of the two electrical terminal tab sets.

For example, the positive and negative terminal tabs of a battery cell may be aligned along a single-direction linear output path of a laser welder. In this example, each terminal tab (e.g., positive and negative, etc.) of a battery cell may be placed in contact with a corresponding terminal tab, of a busbar. Continuing this example, the contacting first terminal tab of the battery cell may be disposed in front of, and in a line with, the contacting second terminal tab of the battery cell. The line may correspond to the linear output path, or laser beam path, of the laser welder. By aligning the terminal tabs of the battery cells in this manner, a laser may be shot at the first terminal tab, welding the first terminal tab of the battery cell to the busbar. Next, the laser may be focused (e.g., narrowing the beam) and a hole can be burned through the welded first terminal tab and busbar connection. Through the burned hole, the laser beam continues along the linear output path to the second terminal tab. Upon receiving sufficient heat from the laser directed through the burned hole, the second terminal tab is welded to the busbar.

In addition to cutting down laser operations and speeding up the process of connecting battery cells to busbars or other receiving connections, the present disclosure offers other advantages and benefits. For instance, the hole in the first terminal connection (i.e., the hole burned through the welded connection of the first terminal tab of the battery cell and the first terminal tab of the busbar) may be sized to create a fuse at the connection. In other words, the hole may be sized to reduce the amount of material joining the first terminal of the battery cell to the busbar. This reduction in material connecting the elements (e.g., the first terminal tab and the busbar) provides a fusible link between the first terminal tab and the busbar. For example, the amount of material remaining at the connection surrounding the hole defines a maximum amount of current that can be conducted via the welded connection (e.g. from the first terminal of the battery cell to the busbar, etc.). In the event more current than the maximum amount of current is passed to the connection, the connection would separate at the points adjacent to the hole. As can be appreciated, this separation prevents an undesired flow of current above a desired rating from transferring to the bus bar and/or one or more components of the electric power distribution system.

In some embodiments, the hole may be burned through the positive terminal tabs only, the negative terminal tabs only, and/or both the positive and the negative terminal tabs.

Referring now to FIG. 1, a perspective view of a battery cell 100 is shown in accordance with embodiments of the present disclosure. The battery cell 100 may comprise a body 104, a top portion 124, a bottom portion 128, and a first terminal 108 and a second terminal (not visible). In some embodiments, the first terminal 108 may correspond to a positive terminal disposed at the top portion 124 of the battery cell 100. In some embodiments, the second terminal may correspond to the negative terminal. The second terminal may be disposed opposite the positive terminal (e.g., at the bottom portion 128 of the battery cell 100). In one embodiment, the second terminal may be disposed on a side of the battery cell 100 other than the bottom portion 128.

The first terminal 108 may be insulated from the second terminal, or other part of the battery cell 100, via an insulation area 116. The insulation area 116 may be configured to electrically isolate the first terminal 108 from the second terminal, body 104, or other part of the battery cell 100. In some embodiments, the insulation area 116 may be made from a plastic, cardboard, paper, linen, composite, or other non-conductive material.

In one embodiment, the battery cell 100 may be substantially cylindrical in shape. Additionally or alternatively, the battery cell 100 may be symmetrical about at least one axis. For example, the battery cell 100 may be substantially symmetrical about a center axis 110 running from the top portion 124 to the bottom portion 128. The battery cell 100 may include one or more manufacturing features 120 including, but in no way limited to, indentations, alignment marks, reference datum, location features, tooling marks, orientation features, etc., and/or the like. As shown in FIG. 1, the manufacturing feature 120 of the battery cell 100 may be a rolled, or sealed, portion of the battery cell 100 (e.g., disposed near a top portion 124 of the battery cell 100).

In any event, the battery cell 100 may be configured to store energy via one more chemicals contained inside the body 104. In some embodiments, the battery cell 100 may be rechargeable and may include one or more chemical compositions, arrangements, or materials, such as, lithium-ion, lead-acid, aluminum-ion, nickel-cadmium, nickel metal hydride, nickel-iron, nickel-zinc, magnesium-ion, etc., and/or combinations thereof. The positive terminal of the battery cell 100 may correspond to the cathode and the negative terminal may correspond to the anode. When connected to the busbar, current from the battery cell 100 may be configured to flow from the terminals of the battery cell 100 through the busbar to one or more components of an electric power distribution system. This current flow may provide power to one or more electrical elements associated with an electric vehicle.

FIG. 1B shows a perspective view of a weldable battery cell 102 including a first terminal tab 112A and a second terminal tab 112B connected to the first terminal 108 and second terminal of the battery cell 100, respectively. The first terminal tab 112A is shown attached to the first terminal 108 at a first attachment point 114A. The second terminal tab 112B is shown attached to the second terminal of the battery cell 100 at a second attachment point 114A. In some embodiments, the attachment may include welding, brazing, or soldering the first terminal tab 112A to the first terminal 108 and welding, brazing, or soldering the second terminal tab 112B to the second terminal of the battery cell 100. Although shown as connected at the top 124 and side of the body 104 of the battery cell 100, respectively, the first and second terminal tabs 112A, 112B may be connected to different ends, portions, or areas, or parts of the battery cell 100 that are separated by at least one insulation area 116.

In some embodiments, the first terminal tab 112A and the second terminal tab 112B may be configured as flat solid metal connectors. The flat solid metal connectors may be made from a conductive material or coating including, but in no way limited to, copper, aluminum, gold, silver, platinum, iron, zinc, nickel, etc., and/or combinations thereof. In any event, these flat solid metal connectors may be bent along an unattached portion of a planar surface of the tab 112, 112B and configured to extend from at least one surface of the weldable battery cell 102. As shown in FIG. 1B, the first and second terminal tabs 112A, 112E are bent to extend in the same axial direction, and/or parallel to the center axis 110, of the weldable battery cell 102. Additionally or alternatively, a flat planar portion of the first terminal tab 112A is disposed substantially parallel to, and offset from, a flat planar portion of the second terminal tab 112B. In some embodiments, the offset distance from the first terminal tab 112A to the second terminal tab 112B may correspond to an offset distance between terminal tabs of a mating busbar.

As shown in FIG. 1B, the first terminal tab 112A is disposed in front of the second terminal tab 112B offset by a distance between them. In some embodiments, a first welding area 220A of the first terminal tab 112A may be in a line (e.g., corresponding to a linear welding, or laser beam, path 322) with a second welding area 220B of the second terminal tab 112B. This line (e.g., path 322) may be substantially perpendicular to the flat or planar surface of the first and second terminal tabs 112A, 112B.

FIG. 2A shows a weldable battery cell 102 separated from a busbar 204 of an electrical system in accordance with embodiments of the present disclosure. In some embodiments, the busbar 204 includes a first terminal 208A having a first terminal tab 212A separated from a second terminal 208B having a second terminal tab 212B via at least one insulation material 210. In some embodiments, the first busbar terminal 208A may correspond to a positive terminal of an electrical system (e.g., an electric power distribution system of a vehicle, etc.). In some embodiments, the second busbar terminal 208B may correspond to the negative terminal of the electrical system (e.g., the electric power distribution system of the vehicle, etc.).

The first busbar terminal tab 212A and the second terminal tab 212B may be configured as substantially flat solid metal connectors. The flat solid metal connectors may be made from a conductive material or coating including, but in no way limited to, copper, aluminum, gold, silver, platinum, iron, zinc, nickel, etc., and/or combinations thereof. In some embodiments, the first busbar terminal tab 212A and the second busbar terminal tab 212B may be sized to match, or substantially match, a size of the first battery cell terminal tab 112A and the second battery cell terminal tab 112B of the weldable battery cell 102. In other embodiments, the busbar terminal tabs 212A, 212B may extend along a length of the busbar 204 and be configured to receive multiple weldable battery cells 102. For example, the busbar terminal tabs 212A, 212B may correspond to two separate parallel plates extending in a continuous length to accommodate multiple weldable battery cells 102 disposed adjacent to one another along an offset parallel plane (i.e., parallel to the plates). In any event, the flat solid metal connectors may be configured to extend from at least one surface of the busbar 204. As shown in FIG. 2A, the first and second busbar terminal tabs 212A, 212B are disposed substantially parallel to, and offset from, one another. In some embodiments, the offset distance from the first busbar terminal tab 212A to the second busbar terminal tab 212B may define the required offset distance between terminal tabs 112A, 112B of a mating weldable battery cell 102.

Figure 2B:
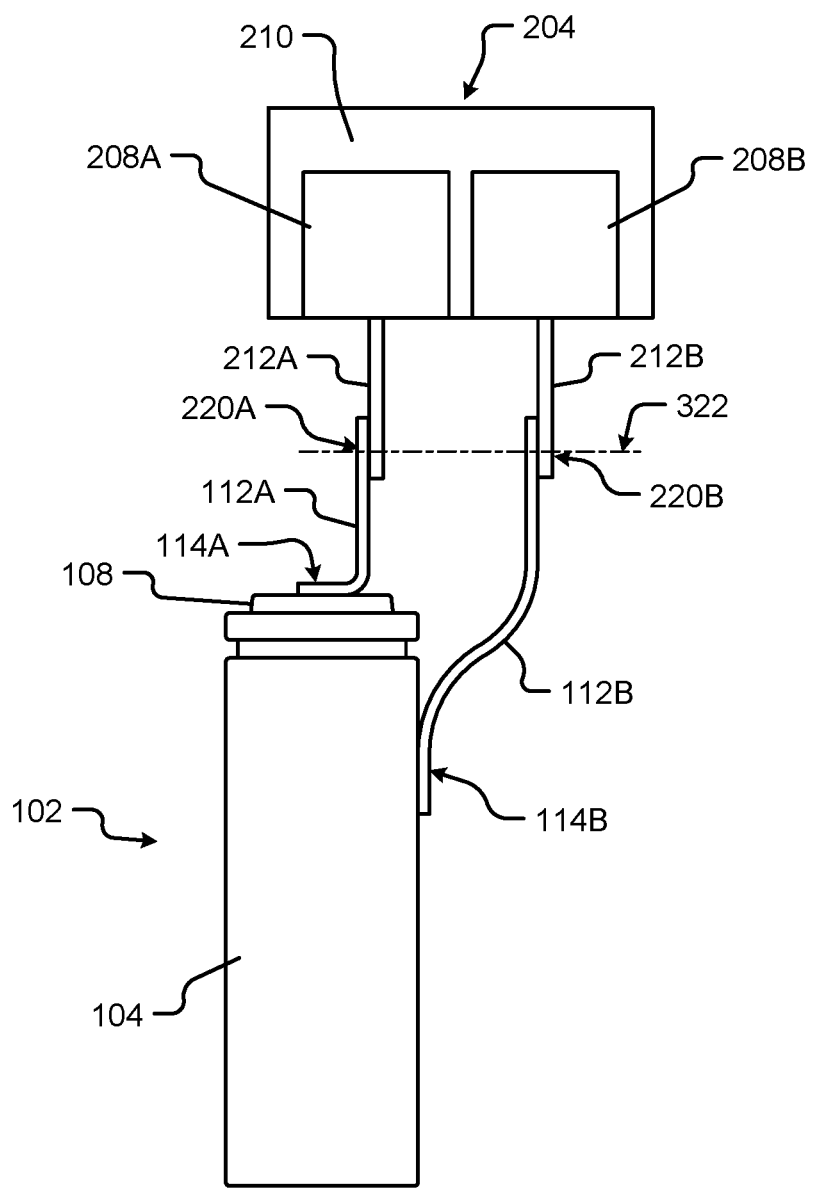
FIG. 2B shows a weldable battery cell in contact with a busbar of an electrical system in accordance with embodiments of the present disclosure.

Referring to FIGS. 2A and 2B, the weldable battery cell 102 may be positioned into contact with the busbar 204 prior to welding. This positioning may include moving the weldable battery cell 102 in a first direction toward the busbar 204 while generally aligning the terminal tabs 112A, 112B with the respective busbar terminal tabs 212A, 212B. In some embodiments, the terminal tabs 112A, 112B of the weldable battery cell 102 may be biased against, and/or moved into contact with, the busbar terminal tabs 212A, 212B by applying a force in second and/or third direction 216B, 216C.

FIG. 2B shows the first and second terminal tabs 112A, 112B of the weldable battery cell 102 in contact with the first and second busbar terminal tabs 212A, 212B. In some embodiments, a portion of each terminal tab 112A, 112B overlaps a portion of each busbar terminal tab 212A, 212B. An area inside this overlapped portion for the first and second terminals 112A, 112B includes the first and second welding areas 220A, 220B. Both the first and second welding areas 220A, 220B are disposed along a line 322. (e.g., a linear welding, or laser beam, path).

Figure 3:
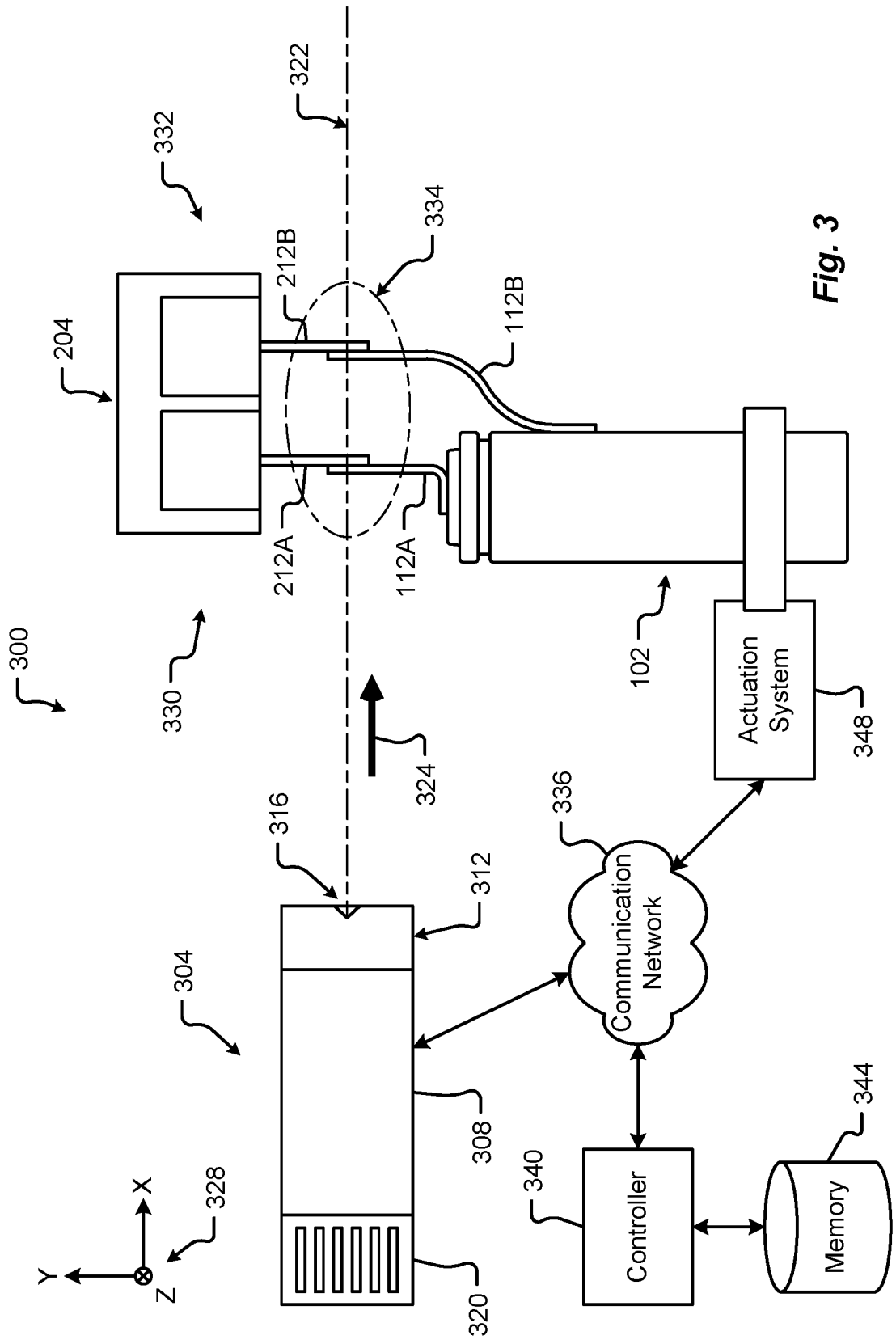
FIG. 3 is a block diagram of a single-position sequential laser welding system in accordance with embodiments of the present disclosure embodiment.

FIG. 3 is a schematic diagram of a single-position sequential laser welding system 300 in accordance with embodiments of the present disclosure embodiment. The laser welding system 300 may include a laser welder 304 comprising a laser 308, a focusing element 312, an aperture 316, and a power supply 320. The laser welder 304 may be configured to convert electrical energy provided via the power supply 320 via the to generate a focusable laser beam that can be emitted from the aperture 316 through the focusing element 312. The focusing element 312 may comprise one or more lenses, filters, mirrors, etc., configured to adjust an intensity, focal point, and/or spread of the laser beam.

In some embodiments, the laser welder 304 may be configured to emit a laser beam in an emission direction 324 running from the laser welder 304 toward the weldable battery cell 102. The laser beam may follow a substantially linear path defined by line 322. This linear path defines the location of the weld areas for the first terminal tab 112A to the first busbar terminal tab 212A and the second terminal tab 112B to the second busbar terminal tab 212B.

Prior to laser welding, the weldable battery cell 102 may be positioned into contact with the busbar 204 via contact between the first set of terminal tabs 112A, 212A and the second set of terminal tabs 112B, 212B. The position of the weldable battery cell 102 may be held in place by one or more end-effectors, clamps, fixtures, tools, etc., and/or the like. In some embodiments, at least one position of the laser welder 304 may be fixed relative to the busbar 204, the weldable battery cell 102, combinations thereof and/or some other reference datum. For instance, the laser welder 304 may be fixed in the Y-axis direction (shown as the vertical direction of the coordinate system 328 of FIG. 3) at a distance offset from the busbar 204. The offset distance may be used to define the location of the laser weld and/or the laser beam acting at an area of the terminal tabs 112A, 212A, 112B, 212B. As provided above, the laser beam may be positioned to emit a laser beam toward an area defined within a region of overlapped material (e.g., an overlap of the first set of terminal tabs 112A, 212A and the second set of terminal tabs 112B, 212B), In some embodiments, two or more weldable battery cells 102 may be disposed side-by-side along a length of the busbar 204. As shown in FIG. 3, the coordinate system 328 defines an X-axis running in a horizontal direction, a Y-axis running in a vertical direction, and a Z-axis running in a direction orthogonal and perpendicular to the X-Y plane shown (e.g., into and/or out of the page). It is anticipated that the two or more weldable battery cells 102 may be disposed side-by-side in the Z-axis direction. The arrangement of cells 102 along a length of the busbar 204 and in the Z-axis direction can allow the laser welder 304 to stay fixed in the Y-axis direction, align with the terminal tabs of a first cell, perform the welding described herein, and index along the Z-axis direction to the terminal tabs of a second cell. Additionally or alternatively, the position of the laser welder 304 may remain fixed in the X-axis direction while moving to subsequent cells disposed along a length of the busbar 204 in the Z-axis direction.

As can be appreciated, the above example describes moving the laser welder 304 relative to the weldable battery cells 102 disposed along a length of the busbar 204. However, the present disclosure is not so limited. For instance, the laser welder 304 may remain fixed in all axes (e.g., the X-axis, Y-axis, and Z-axis) and the busbar 204 and weldable battery cells 102 may move along the Z-axis between welding individual cells 102. In any event, it is an aspect of the present disclosure, that the position of the laser welder 304 remain on a first side 330 of the busbar 204 to perform both welds, that is, the first set of terminal tabs 112A, 212A and the second set of terminal tabs 112B, 212B, without moving to a second side 332 of the busbar 204. It should be appreciated that the laser welder 304 can be positioned on the second side 332 of the busbar 204 to perform both welds, that is, the second set of terminal tabs 112B, 212B and the first set of terminal tabs 112A, 212A, without moving to the first side 330 of the busbar 204. In other words, once the laser welder 304 is positioned on a side of the busbar 204 to completely weld the weldable battery cell 102 to the busbar 204, the laser welder 304 is not moved to the other side. This single-position for the laser welder 304 on one side of the busbar 204 and weldable battery cell 102 to perform multiple welds sequentially allows for fewer setups than compared with traditional welding operations. As provided above, traditional welding operations require the repositioning of a welder to complete all the connection welds for a single battery cell. This repositioning requires multiple setups to a welding system to weld a battery cell to a busbar. The present disclosure describes making one setup to the position of the laser welder 304 in order to make both welds required to completely attach the weldable battery cell 102 to the busbar 204. Additionally or alternatively, both welds may be made by the laser welder 304 of the present disclosure along a single linear laser beam path. Using a single linear laser beam path requires no additional element to redirect a laser beam between welds. As can be appreciated, the present disclosure describes a cost-effective and efficient welding system.

The movement, indexing, alignment, positioning, and/or orientation of one or more components of the laser welding system 300 described above may be performed by at least one actuation system 348. The actuation system 348 may include one or more grippers, actuators, robots, slides, rails, clamps, position-feedback devices, sensors, mechanisms, machines, and/or the like, etc. The actuation system 348 may be configured to move one or more components of the system 300 including, but in no way limited to, the weldable battery cell 102, the bulbar 204, the laser welder 304, etc. In some embodiments, the actuation system 348 and/or other components of the laser welding system 300 may receive instructions and/or commands from a controller 340.

In one embodiment, one or more components of the laser welding system 300 (e.g., the laser welder 304, actuation system 348, etc.) may be operated, positioned, and/or otherwise controlled by a controller 340. The controller 340 may be a part of the laser welder 304 or located separately and apart from the laser welder 304. In any event, the controller 340 may include a processor and a memory 344. The memory 344 may be one or more disk drives, optical storage devices, solid-state storage devices such as a random access memory ("RAM") and/or a read-only memory ("ROM"), which can be programmable, flash-updateable and/or the like. The controller/processor 340 may comprise a general purpose programmable processor or controller for executing application programming or instructions related to the laser welding system 300. Furthermore, the controller/processor 340 can perform operations for configuring and transmitting/receiving, information as described herein. The controller/processor 340 may include multiple processor cores, and/or implement multiple virtual processors. Optionally, the controller/processor 340 may include multiple physical processors. By way of example, the controller/processor 340 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

Examples of the processors 340 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atommt family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In accordance with at least some embodiments of the present disclosure, the communication network 336 may comprise any type of known communication medium or collection of communication media and may use any type of protocols, such as SIP, TCP/IP, SNA, IPX, AppleTalk, and the like, to transport messages between endpoints. The communication network 336 may include wired and/or wireless communication technologies. The Internet is an example of the communication network 336 that constitutes an Internet Protocol (IP) network consisting of many computers, computing networks, and other communication devices located all over the world, which are connected through many telephone systems and other means. Other examples of the communication network 336 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 336 need not be limited to any one network type, and instead may be comprised of a number of different networks and/or network types. The communication network 336 may comprise a number of different communication media such as coaxial cable, copper cable/wire, fiber-optic cable, antennas for transmitting/receiving wireless messages, and combinations thereof.

Figure 4A:
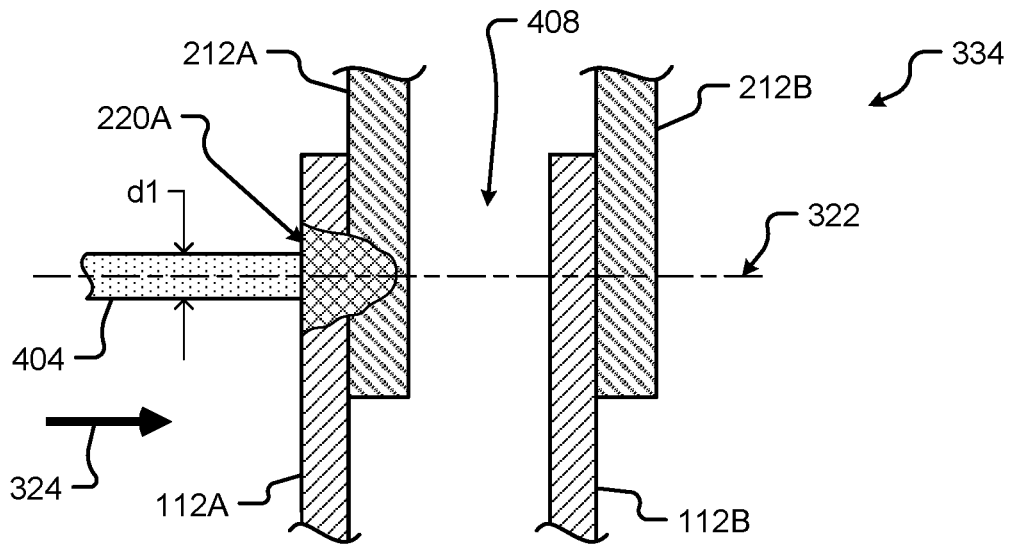
FIG. 4A is a detail partial section view showing a first battery cell terminal tab welding to a first busbar terminal in accordance with an embodiment of the present disclosure.
Figure 4B:
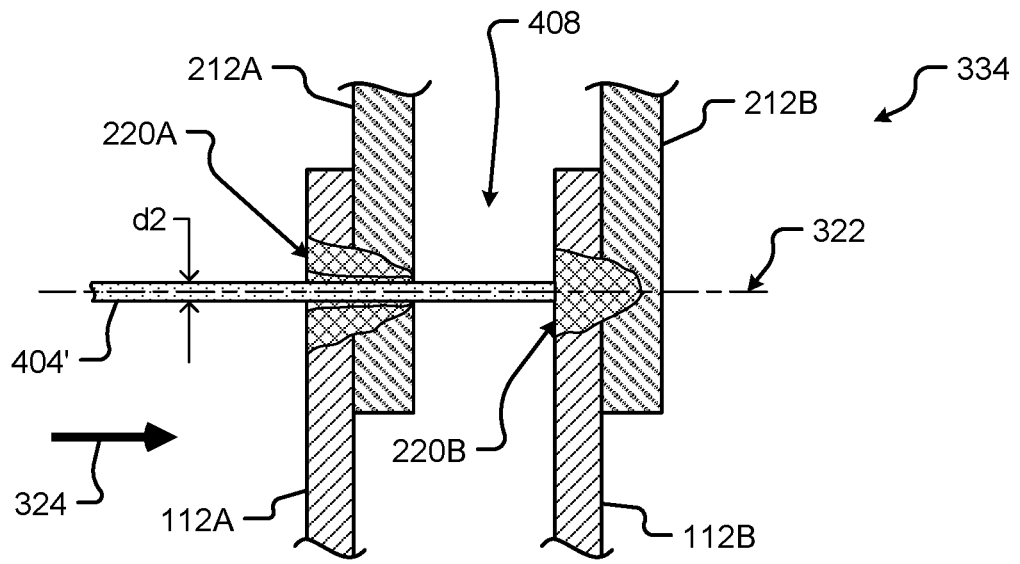
FIG. 4B is a detail partial section view showing a second battery cell terminal tab welding to a second busbar terminal in accordance with an embodiment of the present disclosure.

FIGS. 4A-4B show section views illustrating a first and second weld operation on two sets of tenninal tabs 112A, 212A and 112B, 212B, respectively, in a detail area 334 (see FIG. 3). The first set of terminal tabs 112A, 212A comprising the first battery cell terminal tab 112A and the first busbar terminal tab 212A is shown separated from the second set of terminal tabs 112B, 212B comprising the second battery cell terminal tab 112B and the second busbar terminal tab 212B by an open space 408. The open space 408 may correspond to a distance including an air gap between the sets of terminal tabs. FIG. 4A shows a partial section view of a laser weld beam 404 welding a first battery cell terminal tab 112A and a first busbar terminal tab 212A together. FIG. 4B, shows a partial section view of the same detail area 334 after the first weld has been performed, and the laser weld beam 404 is focused, or narrowed, to burn a hole through the welded first connection and continue to weld (through the hole created) the second battery cell terminal tab 112B and the second busbar terminal tab 212B together.

As shown in FIGS. 4A-4B, the laser weld beam 404, 404' is generated along a laser beam path 322 in a direction 324 toward the sets of terminal tabs 112A, 212A, and 112B, 212B. The first set of terminal tabs 112A, 212A and the second set of terminal tabs 112B, 212B are disposed in the same plane and in a line with the laser beam path 322. In some embodiments, the middle of the flat planar surface of the first battery cell terminal tab 112A is aligned with the middle of the flat planar surface of the second battery cell terminal tab 112B and in the same plane as the laser beam path 322.

Referring to FIG. 4A, the laser weld beam 404 is shown directed toward the first set of terminal tabs 112A, 212A along the laser beam path 322 in an emission direction 324. In one embodiment, the laser weld beam 404 may have a first focus or diameter, d1, at the first welding area 220A. Upon contacting the first battery cell terminal tab 112A, the laser weld beam 404 rapidly heats the material of the first battery cell terminal tab 112A and the material of the contacting first busbar terminal tab 212A. The heat generated by the laser weld beam 404 causes the material of both tabs 112A, 212A to melt and flow together. This interaction between the melted materials at the first welding area 220A causes the tabs 112A, 212A to combine and join to one another. In some embodiments, the diameter, d1, of the laser weld beam 404 may define the size and formation of the penetration of the weld at the first welding area 220A. As shown in FIG. 4A, the penetration of the weld is shown gradually tapering from a first size to a reduced second size in the emission direction 324.

FIG. 4B shows a view of a focused, or narrowed, laser weld beam 404' configured to burn a hole through the welded first set of terminal tabs 112A, 212A and create a path through the hole to the second welding area 220B at the second set of terminal tabs 112B, 212B. Once the laser weld beam 404 shown in FIG. 4A has performed the first weld at the first welding area 220A, the focus is narrowed creating a focused laser weld beam 404' for the laser welder 304. This focused laser weld beam 404' may remain directed toward the first welding area 220A until a hole is burned through the welded first set of terminal tabs 112A, 212A. The focused laser weld beam 404' passes through the hole and the gap 408 between the terminal tabs until it reaches the second welding area 220B. Upon reaching the second welding area 220B, the focused laser weld beam 404' rapidly heats the material of the second battery cell terminal tab 112B and the material of the contacting second busbar terminal tab 212B. The heat generated by the focused laser weld beam 404' causes the material of both tabs 112B, 212B to melt and flow together. Similar to the first weld, this interaction between the melted materials at the second welding area 220B causes the tabs 112B, 212B to combine and join to one another.

Figure 5:
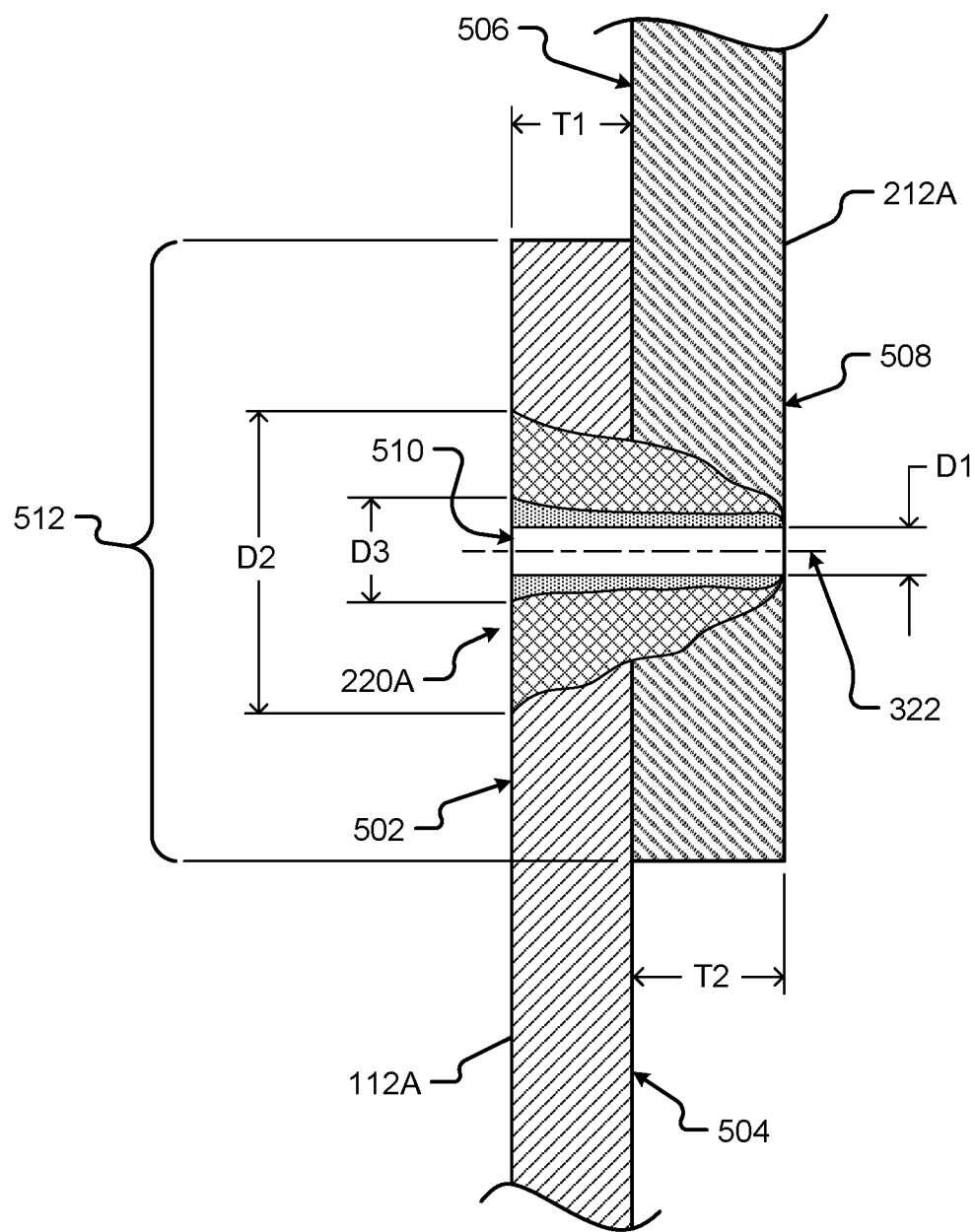
FIG. 5 is a detail partial section view of the welded first battery cell terminal tab and first busbar terminal tab in accordance with embodiments of the present disclosure.

FIG. 5 is a detail partial section view of a welded first battery cell terminal tab 112A and first busbar terminal tab 212A. Although shown and described in an order where one terminal tab (e.g., the first battery cell terminal tab 112A, etc.) is disposed before another terminal tab (e.g., the first busbar terminal tab 212A, etc.) in the laser beam path 322 emission direction 324, it should be appreciated that the order of components is not so limited. For instance, the first busbar terminal tab 212A may be disposed before the first battery cell terminal tab 112A in the emission direction 324, the second busbar terminal tab 212B may be disposed before the second battery cell terminal tab 212B in the emission direction 324, etc., and/or combinations thereof.

As provided above, the first battery cell terminal tab 112A may be configured as a substantially flat solid metal connector having a first planar surface 502 offset from a second planar surface 504 by a first thickness, T1. Similarly, the first busbar terminal tab 212A may be configured as a substantially flat solid metal connector having a first planar surface 506 offset from a second planar surface 508 by a second thickness, T2. Prior to welding, the second planar surface 504 of the first battery cell terminal tab 112A may be biased, positioned, or maintained in contact with the first planar surface 506 of the first busbar terminal tab 212A. In some embodiments, the contact between the first battery cell terminal tab 112A and the first busbar terminal tab 212A may be made across an overlapping region, or contact area, 512.

In FIG. 5, the first welding area 220A is shown as a region of welding penetration and interaction of the material of the first battery cell terminal tab 112A and the first busbar terminal tab 212A. This first welding area 220A includes an affected material laser contact diameter, D2, tapering down, or narrowing, from the first planar surface 502 of the first battery cell terminal tab 112A into the first busbar terminal tab 212A toward the second planar surface of the first busbar terminal tab 212A. This first welding area 220A, and tapered region of affected material, may represent the physical connection of the first battery cell terminal tab 112A to the first busbar terminal tab 212A.

Upon narrowing the focus of the laser welder 304, the focused laser weld beam 404' may be caused to burn, melt, or otherwise create a through hole 510 running from the first planar surface 502 of the first battery cell terminal tab 112A through to the second planar surface 508 of the first busbar terminal tab 212A. As can be appreciated, this through hole 510 passes completely through each of the terminal tabs 112A, 212A, and the connected region of the first welding area 220A in the first set of terminal tabs 112A, 212A. The through hole 510 may have a diameter, D1, and a length equal to the first and second thicknesses, T1 and T2. In some embodiments, as the focused laser weld beam 404' continues to pass through the through hole 510 toward the second set of terminal tabs 112B, 212B, heat generated from the focused laser weld beam 404' may cause the material at a diameter, D3, surrounding the through hole 510 to become more brittle and/or less malleable than the material outside of the diameter, D3, and inside the first welding area 220A. Among other things, this difference in the material properties can offer the benefit of creating a controlled break area, or line, when the first set of terminal tabs 112A, 212A are subjected to an overcurrent event. For example, if the first set of terminal tabs 112A, 212A experience a surge of current (e.g., above that which the cross-sectional area of the connection can handle, etc.) the connection can break, acting as a fuse, propagating along a line from the brittle material surrounding the through hole 510 through the material in the connected region of the first welding area 220A, until the connection and/or contact between the weldable battery cell 102 and the busbar 204 is severed, or broken.

Figure 6:
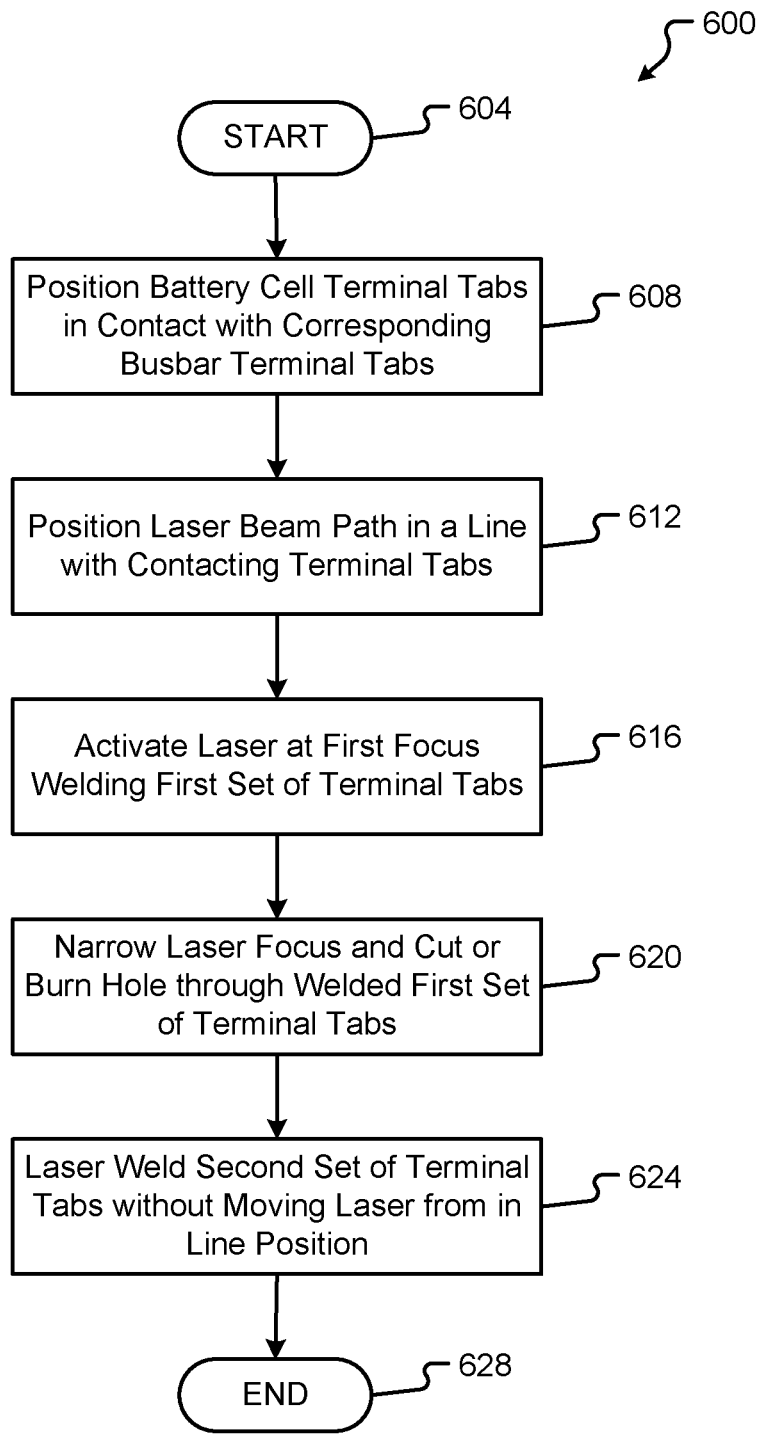
FIG. 6 is a flow diagram of a method for sequentially laser welding terminal tabs of a battery cell to busbar terminal tabs from a single laser position in accordance with embodiments of the present disclosure.

FIG. 6 is a flow diagram of a method for sequentially laser welding terminal tabs of a battery cell 102 to corresponding busbar terminal tabs from a single laser position. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 628. The method 600 can be executed as a set of computer-executable instructions executed by a controller 340, and/or computer system, and encoded or stored on a computer readable medium or memory 344. Hereinafter, the method 600 shall be explained with reference to the systems, components, assemblies, devices, environments, etc. described in conjunction with FIGS. 1-5.

The method 600 begins at step 604 and proceeds by positioning the weldable battery cell 102 terminal tabs 112A, 112B in contact with the corresponding busbar terminal tabs 212A, 212B (step 608). In some embodiments, this positioning may be provided via an actuation system 348. For example, the weldable battery cell 102 may be held and moved into position by a robotic end-effector of the actuation system 348. As another example, the busbar 204 may be positioned into contact with the weldable battery cell 102 via one or more linear actuators and/or robots. In any event, the contact position of the weldable battery cell 102 terminal tabs 112A, 112B includes aligning the first battery cell terminal tab 112A with the first busbar terminal tab 212A and the second battery cell terminal tab 112B with the second busbar terminal tab 212B. The alignment includes positioning one or more sets of the terminal tabs 112A, 112B, and 212A, 212B, such that there is an overlapped contacting region 512 at each of the first and second sets of terminal tabs 112A, 212A, and 112B, 212B. In some embodiments, prior to step 608, the method 600 may include welding the terminal tabs 112A, 112B to the respective positive and negative terminals of the battery cell 100.

Next, the method 600 continues by positioning the sets of contacting terminal tabs 112A, 212A, and 112B, 212B in a line with the laser beam path 322 of a laser welder 304 (step 612). In particular, in this step the terminal tabs 112A, 212A, and 112B, 212B are disposed in a line with the laser beam path 322 such that a laser weld beam 404, 404' emitted in a single emission direction 324 toward the terminal tabs 112A, 212A, and 112B, 212B can create sequential welds of the first set of terminal tabs 112A, 212A and then the second set of terminal tabs 112B, 212B without moving the laser welder 304. In some embodiments, the connected terminal tabs 112A, 212A, and 112B, 212B may be moved (e.g., via an actuation system 348, etc.) into the laser beam path 322 (e.g., associated with a fixed or pre-positioned laser welder 304, etc.). In one embodiment, the laser welder 304 and laser beam path 322 may be moved such that the laser beam path 322 intersects with each overlapped contact region 512 of the connected terminal tabs 112A, 212A, and 112B, 212B in a single line (e.g., where the connected terminal tabs 112A, 212A, and 112B, 212B are maintained in a fixed or pre-positioned location, etc.).

The method 600 proceeds by activating the laser welder 304 at a first focus (step 616). The first focus may define a first width or diameter (e.g., beam diameter, d1, of FIG. 4A) for an emitted laser weld beam 404. In some embodiments, the first diameter, d1, may correspond to a diameter of the beam at a particular focal length or distance from the aperture 316 of the laser welder 304. For instance, this particular focal length may correspond to the distance from the aperture 316 of the laser welder 304 to the first set of terminal tabs 112A, 212A, or more specifically, from the aperture 316 to the first planar surface 502 of the first battery cell terminal tab 112A. In this step, the laser weld beam 404 is emitted in a single linear emission direction 324 toward the first set of terminal tabs 112A, 212A.

As the laser weld beam 404 is directed toward the first set of contacting terminal tabs 112A, 212A, heat from the laser weld beam 404 melts an area of the first battery cell terminal tab 112A and an area of the first busbar terminal tab 212A welding the two terminal tabs 112A, 212A together. In some embodiments, the time the laser weld beam 404 is in contact with the material of the terminal tabs 112A, 212A may determine the amount of heat generated at the first welding area 220A. In one embodiment, an intensity of the laser weld beam 404 may be adjusted by the controller 340 to determine a welding rate and/or amount of heat generated at the first welding area 220A. In any event, the time of contact and/or intensity of the laser weld beam 404 may define a depth of penetration for the weld, a size of the weld contact area, and/or other characteristics of the weld.

Next, the method 600 continues by narrowing the laser focus and continuing to emit the laser along the emission direction 324 and laser beam path 322 toward the first set of terminal tabs 112A, 212A (step 620). This focused laser weld beam 404' may include a second focus for the laser beam defining a second width or diameter (e.g., beam diameter, d2, of FIG. 4B) for the emitted focused laser weld beam 404'. In some embodiments, the second diameter, d2, may correspond to a diameter of the beam at a particular focal length or distance from the aperture 316 of the laser welder 304. The second diameter, d2, may be smaller or less than the first diameter, d1, for the laser weld beam 404.

As the focused laser weld beam 404' is directed toward the first set of contacting terminal tabs 112A, 212A, including a smaller beam diameter, d2, than the laser weld beam 404 in step 616, heat generated by e focused laser weld beam 404' may cause a hole 510 to be melted through the first battery cell terminal tab 112A and the first busbar terminal tab 212A. Once the focused laser weld beam 404' burns through the first set of terminal tabs 112A, 212A, the focused laser weld beam 404' may be caused to pass through the hole 510, continuing along the single linear emission direction 324 and laser beam path 322 toward the second set of terminal tabs 112B, 212B, disposed behind the first set of terminal tabs 112A, 212A. In some embodiments, the focused laser weld beam 404' may be further narrowed or focused (e.g., such that the laser beam diameter is smaller than the first diameter, d1, and second diameter, d2) once the hole 510 is burned through the first set of terminal tabs 112A, 212A.

The method 600 may proceed by continuing to emit the laser along the emission direction 324 and laser beam path 322 through the hole 510 toward the second set of terminal tabs 112B, 212B (step 624). In some embodiments, this step is performed without moving the laser welder 304 and/or the laser beam path 322 from the position of the laser welder 304 during the welding of the first set of terminal tabs 112A, 212A. In other words, all of the welds completely attaching a weldable battery cell 102 to a busbar 204, as described herein, may be performed without moving the laser welder 304 relative to the terminal tabs 112A, 212A, 112B, 212B, the terminal tabs 112A, 212A, 112B, 212B relative to the laser welder 304, or altering the laser beam path 322 in any way. As the focused laser weld beam 404' is directed toward the second set of contacting terminal tabs 112B, 212B, heat from the focused laser weld beam 404' melts an area of the second battery cell terminal tab 112B and an area of the second busbar terminal tab 212B welding the two terminal tabs 112B, 212B together. In some embodiments, the time the focused laser weld beam 404' is in contact with the material of the terminal tabs 112B, 212E may determine the amount of heat generated at the second welding area 220B. In one embodiment, an intensity of the focused laser weld beam 404' may be adjusted by the controller 340 to determine a welding rate and/or amount of heat generated at the second welding area 220B in any event, the time of contact and/or intensity of the focused laser weld beam 404' may define a depth of penetration for the weld, a size of the weld contact area, and/or other characteristics of the weld at the second welding area 220B. The method 600 ends at step 628.

Any of the steps, functions, and operations discussed herein can be performed continuously and automatically.

The exemplary systems and methods of this disclosure have been described in relation to laser welding systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein, Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed. Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a laser welding system, comprising: a laser welder configured to emit a laser weld beam along a linear laser path in an emission direction; a controller, configured to: activate an emission of the laser weld beam from the laser welder at a first beam diameter in the emission direction and along the linear laser path toward a first and second substrate in contact with one another, wherein the emission of the laser weld beam forms a welded connection between the first and second substrate after a first period of time; narrow a focus of the laser weld beam changing the first beam diameter to a smaller second beam diameter, wherein the narrowed laser weld beam burns a hole through a portion of the welded connection and the first and second substrates after a second period of time; and maintain the laser welder in an emitting state such that the narrowed laser weld beam is directed through the hole and along the linear laser path in the emission direction toward a third and fourth substrate in contact with one another, wherein the emission of the narrowed laser weld beam welds the third and fourth substrate together after a third period of time.

Aspects of the above laser welding system include wherein the first and second substrates remain connected together at a periphery of the hole burned through the first and second substrates. Aspects of the above laser welding system include wherein an air gap separates the first and second substrates from the third and fourth substrates. Aspects of the above laser welding system include wherein the first and second substrates are in a line with the third and fourth substrates. Aspects of the above laser welding system include wherein the first substrate is first terminal tab of a battery cell, the second substrate is a first terminal tab of a busbar, the third substrate is a second terminal tab of the battery cell, and the fourth substrate is a second terminal tab of the busbar. Aspects of the above laser welding system include wherein prior to forming the welded connection, the first and second terminal tabs of the battery cell are separate from the first and second terminal tabs of the busbar. Aspects of the above laser welding system further comprising: an actuator system configured to position the first and second terminal tabs of the battery cell in contact with and overlapping a portion of the first and second terminal tabs of the busbar prior to activating the emission of the laser weld beam.

Embodiments include a laser welding method, comprising: activating, via a controller, a laser welder causing the laser welder to emit a laser weld beam at a first beam diameter along a linear laser path and in an emission direction toward a first substrate; welding, via the emitted laser weld beam, the first substrate to a second substrate in contact with and overlapping the first substrate at a first weld area; narrowing, via the controller, the laser weld beam from the first beam diameter to a smaller second beam diameter; burning, via the narrowed laser weld beam, a hole through the welded first and second substrate inside the first weld area; emitting the narrowed laser weld beam through the hole burned in the welded first and second substrate along the linear laser path to a third substrate spaced apart from the first and second substrate; and welding, via the narrowed laser weld beam, the third substrate to a fourth substrate in contact with and overlapping the third substrate at a second weld area.

Aspects of the above laser welding method include wherein narrowing the laser weld beam further comprises: determining, via the controller, a desired size for the hole to be burned through the first and second substrates; and focusing, via the controller, the laser weld beam to the second beam diameter, wherein the second beam diameter is smaller than a diameter of the first weld area and configured to create the determined desired size for the hole. Aspects of the above laser welding method include wherein determining the desired size for the hole to be burned through the first and second substrates further comprises: determining a cross-sectional area for a connection between the first and second substrate; determining an overload protection cross-sectional area less than the cross-sectional area for the connection between the first and second substrate; determining a difference between the overload protection cross-sectional area and the cross-sectional area; and sizing the desired hole size to include the difference determined.

Aspects of the above laser welding method further comprising: maintaining a position of the laser welder between welding the first and second substrates and welding the third and fourth substrates. Aspects of the above laser welding method include wherein prior to activating the laser welder, the method further comprises: positioning, via an actuation system, the first substrate into contact with the second substrate and the third substrate with the fourth substrate. Aspects of the above laser welding method include wherein prior to activating the laser welder, the method further comprises: positioning, via an actuation system, the first substrate into contact with the second substrate and the third substrate with the fourth substrate.

Embodiments include a method of manufacturing a laser welded battery cell and busbar connection, comprising: arranging first and second terminal tabs of a battery cell in contact with corresponding first and second terminal tabs of a busbar; positioning a portion of the contacting terminal tabs in a single linear laser path; activating an emission of a laser weld beam from a laser welder at a first beam diameter in an emission direction along the linear laser path toward the first terminal tab of the battery cell in contact with the first terminal tab of the busbar; welding the first terminal tab of the battery cell to the first terminal tab of the busbar at a first weld area; narrowing the laser weld beam from the first beam diameter to a smaller second beam diameter; burning a hole through the welded first terminal tabs of the battery cell and busbar inside the first weld area; emitting the narrowed laser weld beam through the hole and along the linear laser path to the second terminal tab of the battery cell spaced apart from the first terminal tabs of the battery cell and busbar, and welding, via the narrowed laser weld beam, the second terminal tab of the battery cell to the second terminal tab of the busbar at a second weld area.

Aspects of the above method of manufacturing include wherein the first terminal tabs of the battery cell and busbar remain connected together at a periphery of the hole burned through the first terminal tabs of the battery cell and busbar. Aspects of the above method of manufacturing include wherein an air gap separates the first terminal tabs of the battery cell and busbar from the second terminal tabs of the battery cell and busbar. Aspects of the above method of manufacturing include wherein narrowing the laser weld beam further comprises: determining, via the controller, a desired size for the hole to be burned through the first terminal tabs of the battery cell and busbar, and focusing, via the controller, the laser weld beam to the second beam diameter, wherein the second beam diameter is smaller than a diameter of the first weld area and configured to create the determined desired size for the hole. Aspects of the above method of manufacturing include wherein determining the desired size for the hole to be burned through the first terminal tabs of the battery cell and busbar further comprise: determining a cross-sectional area for a connection between the first terminal tabs of the battery cell and busbar; determining an overload protection cross-sectional area less than the cross-sectional area for the connection between the first terminal tabs of the battery cell and busbar; determining a difference between the overload protection cross-sectional area and the cross-sectional area; and sizing the desired hole size to include the difference determined. Aspects of the above method of manufacturing include wherein the first terminal tabs of the battery cell and busbar including the hole provide a fusible link between the battery cell and the busbar. Aspects of the above method of manufacturing include wherein all of the welding is performed from one side of the busbar and wherein the position of the laser welder remains unchanged between welds.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A laser welding system, comprising:
   a laser welder configured to emit a laser weld beam along a linear laser path in an emission direction; and
   a controller, configured to:
      activate an emission of the laser weld beam from the laser welder at a first beam diameter in the emission direction and along the linear laser path toward a first and second substrates in contact with one another, wherein the emission of the laser weld beam forms a welded connection between the first and second substrates after a first period of time;
      narrow a focus of the laser weld beam changing the first beam diameter to a smaller second beam diameter, wherein the narrowed focus of the laser weld beam burns a hole through a portion of the welded connection and the first and second substrates after a second period of time; and
      maintain the laser welder in an emitting state such that the narrowed focus of the laser weld beam is directed through the hole and along the linear laser path in the emission direction towards third and fourth substrates in contact with one another, wherein the emission of the narrowed focus of the laser weld beam welds the third and fourth substrates together after a third period of time, and wherein an air gap separates the first and second substrates a distance from the third and fourth substrates.

2. The laser welding system of claim 1, wherein the first and second substrates remain connected together at a periphery of the hole burned through the first and second substrates.

3. The laser welding system of claim 1, wherein the third and fourth substrates are welded together without burning the hole through the fourth substrate.

4. The laser welding system of claim 1, wherein the first and second substrates are arranged in a line with the third and fourth substrates.

5. The laser welding system of claim 4, wherein the first substrate is a first battery terminal tab of a battery cell, the second substrate is a first busbar terminal tab of a busbar, the third substrate is a second battery terminal tab of the battery cell, and the fourth substrate is a second busbar terminal tab of the busbar.

6. The laser welding system of claim 5, wherein prior to forming the welded connection, the first and second battery terminal tabs are separate from the first and second busbar terminal tabs.

7. The laser welding system of claim 6, further comprising:
   an actuator system configured to position the first and second battery terminal tabs in contact with and overlapping a portion of the first and second busbar terminal tabs prior to activating the emission of the laser weld beam.

8. A laser welding method, comprising:

activating, via a controller, a laser welder causing the laser welder to emit a laser weld beam at a first beam diameter along a linear laser path and in an emission direction towards a first substrate;

welding, via the emitted laser weld beam, the first substrate to a second substrate in contact with and overlapping the first substrate at a first weld area;

narrowing, via the controller, the laser weld beam from the first beam diameter to a smaller second beam diameter;

burning, via the narrowed laser weld beam, a hole through the welded first and second substrates inside the first weld area;

emitting the narrowed laser weld beam through the hole burned in the welded first and second substrates along the linear laser path through an air gap to a third substrate, the air gap separating the third substrate from the first and second substrates by a distance; and welding, via the narrowed laser weld beam, the third substrate to a fourth substrate in contact with and overlapping the third substrate at a second weld area.

9. The laser welding method of claim 8, wherein narrowing the laser weld beam further comprises:

determining, via the controller, a desired size for the hole to be burned through the first and second substrates; and focusing, via the controller, the laser weld beam to the second beam diameter, wherein the second beam diameter is smaller than a diameter of the first weld area and configured to create the desired size for the hole.

10. The laser welding method of claim 9, wherein determining the desired size for the hole to be burned through the first and second substrates further comprises:

determining a cross-sectional area for a connection between the first and second substrate;

determining an overload protection cross-sectional area less than the cross-sectional area for the connection between the first and second substrate;

determining a difference between the overload protection cross-sectional area and the cross-sectional area; and sizing the desired size for the hole to include the difference determined.

11. The laser welding method of claim 9, further comprising:

maintaining a position of the laser welder between welding the first and second substrates and welding the third and fourth substrates.

12. The laser welding method of claim 11, wherein prior to activating the laser welder, the method further comprises:

positioning, via an actuation system, the first substrate into contact with the second substrate and the third substrate with the fourth substrate.

13. The laser welding method of claim 11, wherein prior to activating the laser welder, the method further comprises:

aligning, via an actuation system, a portion of the first substrate, second substrate, third substrate, and fourth substrate in a line with the linear laser path.

14. A method of manufacturing a laser welded battery cell and busbar connection, comprising:

arranging first and second battery terminal tabs of a battery cell in contact with corresponding first and second busbar terminal tabs of a busbar;

positioning a portion of the first battery terminal tab and the second battery terminal tab contacting the first busbar terminal tab and the second busbar terminal tab, respectively, in a single linear laser path;

activating an emission of a laser weld beam from a laser welder at a first beam diameter in an emission direction along the single linear laser path towards the first battery terminal tab in contact with the first busbar terminal tab;

welding the first battery terminal tab to the first busbar terminal tab at a first weld area;

narrowing the laser weld beam from the first beam diameter to a smaller second beam diameter;

burning a hole through the welded first battery terminal tab and the first busbar terminal tab inside the first weld area;

emitting the narrowed laser weld beam through the hole and along the single linear laser path through an air gap to the second battery terminal tab, the air gap separating the second battery terminal tab a distance from the welded first battery terminal tab and the first busbar terminal tab; and welding, via the narrowed laser weld beam, the second battery terminal tab to the second busbar terminal tab at a second weld area.

15. The method of manufacturing of claim 14, wherein the first battery terminal tab and the first busbar terminal tab remain connected together at a periphery of the hole burned through the first battery terminal tab and the first busbar terminal tab.

16. The method of manufacturing of claim 15, wherein the second battery terminal tab and the second busbar terminal tab are welded together without burning the hole through the second busbar terminal tab.

17. The method of manufacturing of claim 15, wherein narrowing the laser weld beam further comprises:

determining, via a controller, a desired size for the hole to be burned through the first battery terminal tabs of the battery cell and busbar; and focusing, via the controller, the laser weld beam to the second beam diameter, wherein the second beam diameter is smaller than a diameter of the first weld area and configured to create the desired size for the hole.

18. The method of manufacturing of claim 17, wherein determining the desired size for the hole to be burned through the first battery terminal tabs of the battery cell and busbar further comprises:

determining a cross-sectional area for a connection between the first battery terminal tabs of the battery cell and busbar;

determining an overload protection cross-sectional area less than the cross-sectional area for the connection between the first battery terminal tabs of the battery cell and busbar;

determining a difference between the overload protection cross-sectional area and the cross-sectional area; and sizing the desired size for the hole to include the difference determined.

19. The method of manufacturing of claim 18, wherein the first battery terminal tab and the first busbar terminal tab including the hole provide a fusible link between the battery cell and the busbar.

20. The method of manufacturing of claim 19, wherein all of the welding is performed from one side of the busbar and wherein a position of the laser welder remains unchanged between welds.

* * * * *